METHOD OF MAKING TUBULAR MEMBERS

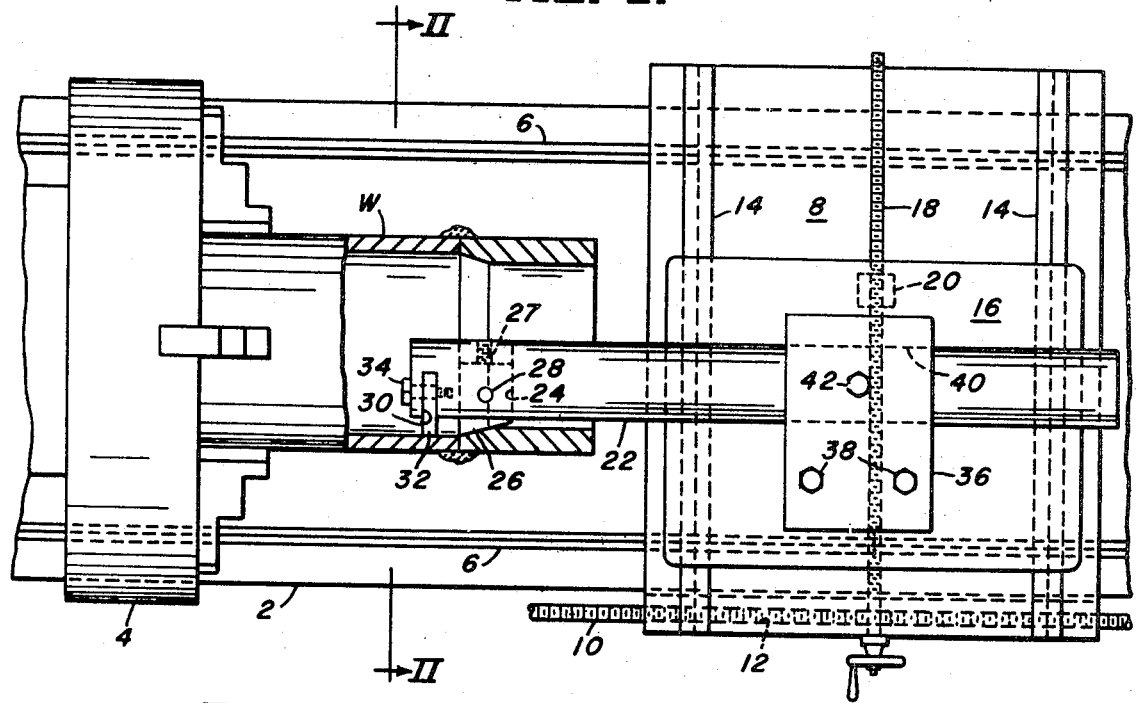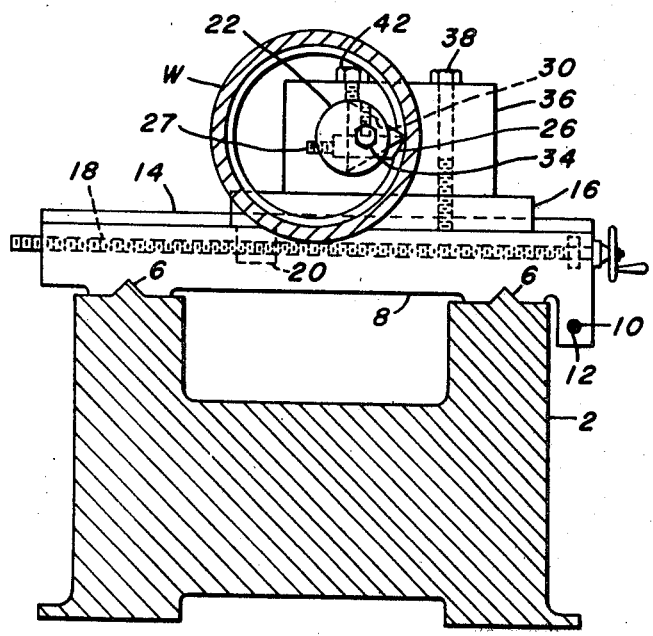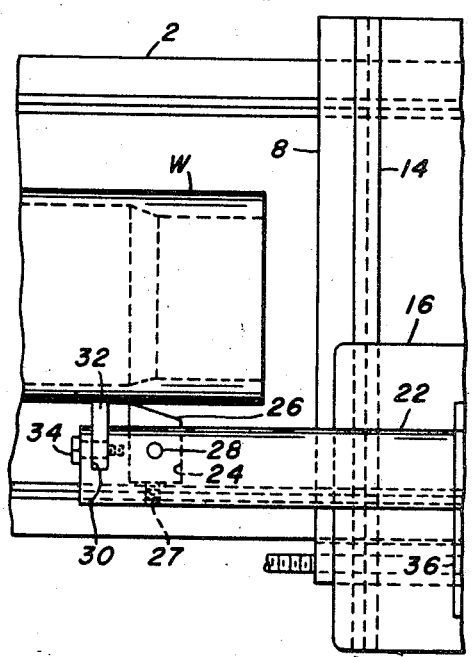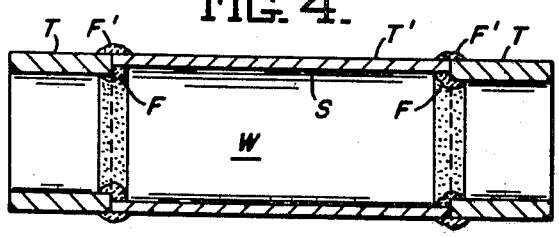
INVENTORS.
SAMUEL KATUNICH and
HERBERT J. PETERSON
By Martin J. Carroll
Attorney Aug. 25, 1970     S. KATUNICH ETAL     3,525,144

Original Filed Oct. 25, 1967     2 Sheets-Sheet 2

INVENTORS.
SAMUEL KATUNICH and
HERBERT J. PETERSON

By Martin J. Carroll
Attorney

United States Patent Office 3,525,144
Patented Aug. 25, 1970

3,525,144
METHOD OF MAKING TUBULAR MEMBERS
Samuel Katunich, Baldwin Borough, and Herbert J. Peterson, McKeesport, Pa., assignors to United States Steel Corporation, a corporation of Delaware
Original application Oct. 25, 1967, Ser. No. 677,891. Divided and this application July 10, 1969, Ser. No. 840,792
Int. Cl. B23k 31/02
U.S. Cl. 29—471.1         2 Claims

ABSTRACT OF THE DISCLOSURE

A method of making a tubular member having internal and/or external upsets on one or both ends; including the steps of welding a first tube to a second tube having a thicker wall thickness than the first tube in aligned relationship, with weld flashes on the inside and outside surfaces, and then inserting the boring bar into the opening through the tubes with its guide in contact with the inner wall of the first tube and the cutter in engagement with the inside weld flash, causing relative longitudinal movement between the rotating tubes and the boring bar to remove the inside weld flash, and positioning the boring bar outside the welded tubes with the guide in contact with the outer wall of the first tube and the cutter in engagement with the outside weld flash, and causing relative longitudinal movement between the rotating tubes and the boring bar to remove the outside weld flash.

---

This application, which is a division of my co-pending application, Ser. No. 677,891, filed Oct. 25, 1967, now Pat. No. 3,501,981 relates to a method of making a tubular member having an upset on at least one end thereof. Drill rods for use in the diamond core drilling industry have an internal upset on each end and prior to our invention this product was produced by hot forge upsetting which is an expensive operation. We have found that a product of the same or better quality can be obtained at considerable less cost by friction welding short, heavy wall sections to the ends of light wall tubing. In doing this a weld flash is formed between the heavy and light wall tubing, both on the inner and outer surfaces. Originally these weld flashes were machined off from both the inside and outside surfaces in a lathe. Although alignment was made on the outside diameter of the tubing, detrimental undercutting resulted because of ovality, eccentricity and mis-alignment of the parts when all of the weld flash was removed.

It is therefore an object of our invention to provide an inexpensive method of making a tubular member having an upset on at least one end.

This and other objects will be more apparent after referring to the following specification and attached drawings, in which:

FIG. 1 is a plan view showing apparatus used in practicing the method of our invention;

FIG. 2 is a view taken on the line II—II of FIG. 1;

FIG. 3 is a fragmentary view, similar to FIG. 1, but showing the parts in position to remove the weld flashes from the outer surface;

FIG. 4 is a sectional view of the tubular product prior to machining;

Figure 5:
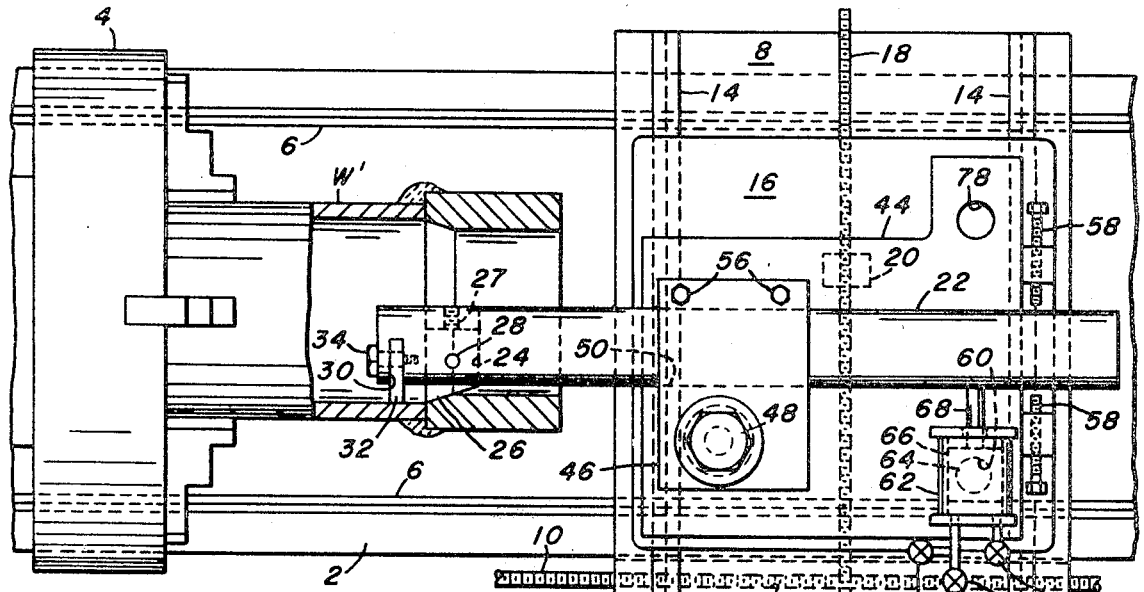
FIG. 5 is a view, similar to FIG. 1, showing other apparatus which may be used in the practice of our invention.

Referring more particularly to the drawings, reference numeral 2 indicates the bed of a lathe having a work receiving chuck 4 thereon. Spaced from the chuck 4 and also mounted on the bed 2 are inverted V-shaped guides 6 arranged parallel to the axis of the chuck 4. Carriage 8 is mounted on the guides 6 for movement toward and away from the chuck 4. Such movement is provided by a longitudinal feed screw 10 mounted on the base 2 and engaging threaded openings 12 in the carriage 8. Guides 14 on carriage 8 support a cross slide 16 which is moved by means of a screw 18 supported on the carriage 8 and passing through nut 20 on the cross slide. The parts so far described are conventional.

According to our invention we provide a longitudinal boring bar 22 having a transverse slot 24 at one end for receiving a contoured cutting tool 26 which is positioned by means of adjusting screw 27 and held in adjusted position by means of a set screw 28. A second transverse slot 30 is provided in the boring bar 22 between the slot 24 and the adjacent end of the boring bar. A stylus or guide 32 is received in the slot 30 and is held in place by means of a clamping screw 34 passing through the guide 30 and threaded into the bar 22.

In accordance with the species shown in FIGS. 1, 2 and 3 a bar holder 36 is mounted on and secured to cross slide 16 by means of mounting screws 38. The bar holder 36 has a hole 40 therethrough for receiving the boring bar 22 which is held in place by means of a lock screw 42 which pases vertically through a threaded opening in the top of bar holder 36 and bears against the top of the bar 22.

In carrying out our method, a tube T is friction welded to each end of a tube T' in axial alignment therewith. The tubes T have a thicker wall thickness than tube T'. As shown in FIG. 4, tubes T and T' have the same external diameter, but the tubes T have a smaller internal diameter than the tube T'. This provides a workpiece W having a center section of maximum internal diameter providing a reference surface S, inner weld flashes F, and outer weld flashes F'. It will also be understood that the tube T may have the same internal diameter as tube T' and a larger external diameter or both a smaller internal diameter and a larger external diameter. In any of these situations the machining operations are essentially the same. One end of the workpiece W is received in the chuck 4 and the boring bar 22, supported in the holder 36, is positioned with the cutter 26 and guide 32 within the workpiece W. The tool 26 and guide 32 project radially the same distance from the axis of the bar 22 and the cross slide 16 is positioned so that the axis of the boring bar 22 within the holder 36 is closer to the side of the workpiece W contacted by the tool than to the other side so that the cutter 26 is held against the workpiece and the guide 32 contacts the surface S. The chuck 4 is then rotated and the carriage 8 slowly retracted until all the flash is removed as shown in FIG. 1. The workpiece W is then removed from the chuck 4 and replaced in the chuck with the ends reversed after which the inner weld flashes F at the other end are removed in the same manner. After the internal machining operation is completed the boring bar is retracted, the cross slide 16 is moved transversely and the boring bar 22 positioned as shown in FIG. 3 with the tool against the workpiece W and the guide 32 bearing against the outer surface of the workpiece. Here, too, the axis of the boring bar 22 at the holder 36 is positioned inwardly further than the axis at the cutter so that the guide and cutter are resiliently urged against the workpiece. The chuck 4 is rotated and the tool and guide moved longitudinally until the outer flash F' is removed. The operation is then repeated on the opposite end of the workpiece W. It will be understood that the sequence of operations may be varied from that described. In other words, the inner and outer flash may be removed from one end first and then the outer and inner flash removed from the other end rather than removing the internal flash from both ends and then the outer flash of both ends. Since the guide 32 follows the contour of the tube surfaces no detrimental undercutting takes place. Thus, a completed drill rod having an inner and outer contour at its ends, as shown in FIG. 3, is provided.

Figure 6:
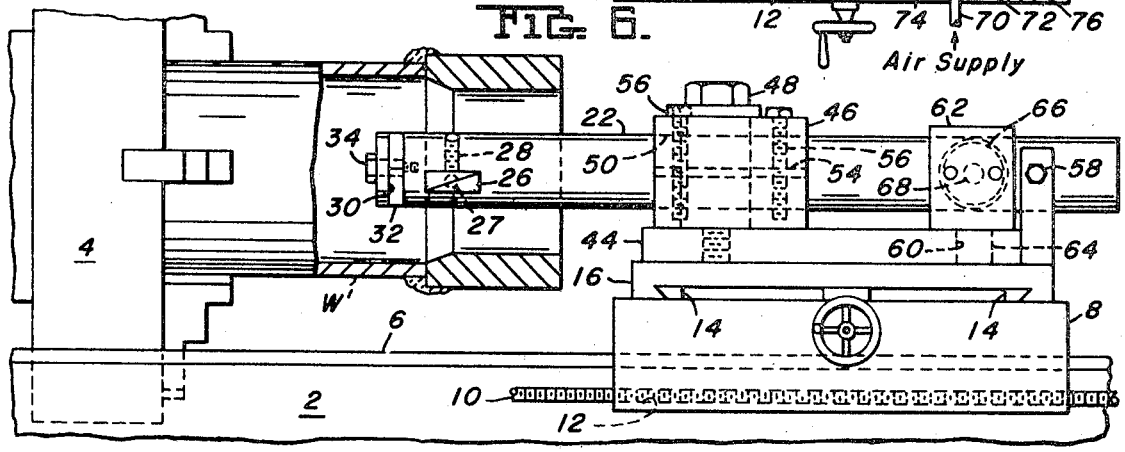
FIG. 6 is a side elevation of FIG. 1.
Figure 7:
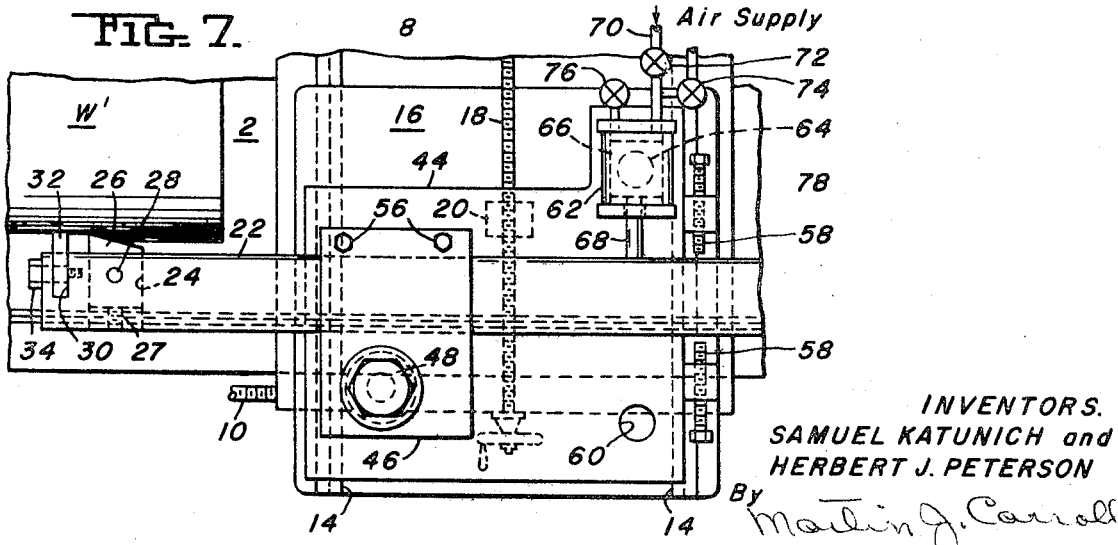
FIG. 7 is a fragmentary view, similar to FIG. 5, but showing the parts in position to remove the weld flashes from the outer surface.

In the embodiment of our apparatus shown in FIGS. 5, 6 and 7, a base plate 44 is mounted on the cross slide 16. A swivel clamp block 46 is pivotally mounted on base plate 44 by means of a swivel pin 48 which passes through block 46 and is screwed into base plate 44. Block 46 has a longitudinal hole 50 therethrough for receiving boring bar 22 with a horizontal slot 54 extending from the hole 50 to the outside of the block 46 on the side opposite pin 48. The bar 22 is clamped in the hole 50 by means of clamping screws 56 which pass vertically through the block 46 so as to pull the upper and lower sides of the horizontal slot together. Adjustable screw stops 58 are fixed on the rear vertical side of base plate 44 to limit lateral movement of boring bar 22. A vertical hole 60 is provided in the base plate 44 at the rear thereof on the same side of boring bar 22 as pin 48. A conventional single action air cylinder 62 has a cylindrical lug 64 thereon which is received in the hole 60. Piston 66 received within cylinder 62 has a piston rod 68 which is adapted to contact boring bar 22. Air is supplied to the cylinder 62 through conduit 70 having a manually operated valve 72 therein and air is exhausted from the cylinder 62 through manually operated valve 74. A variable bleed valve 76 controls the gas pressure during the machining operation. A vertical hole 78 similar to hole 60 is provided on base plate 44 on the opposite side of bar 22.

In operation, the workpiece W' is positioned in the chuck 4 and the boring bar 22 is positioned within the workpiece W in the same manner as in the first embodiment. The end tube sections of workpiece W' are shown as having a larger outside diameter and a smaller inside diameter than the central tube sections, but this has no major effect on the machining operation. Valve 72 is opened and valve 74 closed to introduce gas into cylinder 62 so as to resiliently hold the piston rod 68 against the boring bar 22, thus causing the block 46 to pivot about pin 48 and urge the cutter 26 and guide 32 against the workpiece. The weld flash is then removed from the inside of the workpiece as in the first embodiment. Upon completion of the machining operation valve 72 is closed and valve 74 opened. The operation is then repeated on the other end of the workpiece W'.

To remove the outside flash the cylinder 62 is removed from hole 60 and placed in hole 78 with the conduit 70 and valves 72, 74 and 76 attached thereto. For ease of handling it is preferred that the conduit 70 be flexible although it will be understood that a second conduit could be supplied leading to a position adjacent hole 78 with a separate connection in the conduit. The boring bar is then positioned on the outside of the workpiece W as shown in FIG. 7 and the outside flash removed in the same manner as in the first embodiment.

We claim:

1. The method of making a tubular member having an upset on one end thereof which comprises welding a first tube to a second tube having a thicker wall thickness than the first tube in end to end aligned relationship such that weld flashes result on the inside and outside surfaces thereof, then rotating said welded tubes about their longitudinal axes, inserting an elongated boring bar having a transverse cutter and guide thereon into the opening through said tubes, resiliently urging said boring bar transversely to cause said guide to contact the inner wall of one of said tubes and the cutter to engage the inside weld flash, causing relative longitudinal movement between said rotating tubes and said boring bar until the inside weld flash is removed, positioning said boring bar outside said welded tubes, resiliently urging said boring bar transversely to cause said guide to contact the outer wall of one of said tubes and the cutter to engage the outside weld flash, and causing relative longitudinal movement between said rotating tubes and said boring bar until the outside weld flash is removed.

2. The method of claim 1 including welding a third tube having a thicker wall than said first tube to the other end of said first tube, and removing the weld flashes at the connection between the first and third tubes in the same manner as the weld flashes are removed at the connection between the first and second tubes.

References Cited

UNITED STATES PATENTS

| | | | |
|---|---|---|---|
| 2,257,335 | 9/1941 | Evans et al. | 29—486 XR |
| 2,352,306 | 6/1944 | Anderson | 29—33.1 XR |
| 2,354,289 | 7/1944 | Babb | 29—33.1 XR |
| 2,564,391 | 8/1951 | Burns | 29—481 |
| 2,714,338 | 8/1955 | Nance | 29—33.1 |
| 2,763,923 | 9/1956 | Webb | 29—481 XR |
| 3,103,834 | 9/1963 | Neukom | 90—24.03 XR |
| 3,108,374 | 10/1963 | Bowman | 29—33.1 XR |

JOHN E. CAMPBELL, Primary Examiner

R. B. LAZARUS, Assistant Examiner

U.S. Cl. X.R.

29—481, 486